United States Patent
Armes et al.

(10) Patent No.: US 8,504,474 B2
(45) Date of Patent: Aug. 6, 2013

(54) CONSOLIDATED PAYMENT ACCOUNT SYSTEM AND METHOD

(75) Inventors: David Armes, Phoenix, AZ (US); Fred A. Bishop, Glendale, AZ (US); Lydia C. Breck, New York, NY (US); Jeff Fehlhaber, Glendale, AZ (US); Gabriella P. Fitzgerald, New York, NY (US); Elliott Glazer, Chesterfield, VA (US); Sohail Hussain, Scottsdale, AZ (US); Margaret C. Mitchell, Phoenix, AZ (US); Trey Neeman, Glendale, AZ (US); Leah M. Sweet, Goodyear, AZ (US); Dirk White, Temecula, CA (US); Jessica Zoob, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 12/845,412

(22) Filed: Jul. 28, 2010

(65) Prior Publication Data

US 2011/0004551 A1    Jan. 6, 2011

Related U.S. Application Data

(63) Continuation of application No. 10/176,729, filed on Jun. 21, 2002, now Pat. No. 7,783,566.

(60) Provisional application No. 60/301,337, filed on Jun. 27, 2001.

(51) Int. Cl.
*G06Q 40/00* (2012.01)

(52) U.S. Cl.
USPC .......................................................... 705/39

(58) Field of Classification Search
USPC ..................................................... 705/39, 40
See application file for complete search history.

(56) References Cited

U.S. PATENT DOCUMENTS

| | | | |
|---|---|---|---|
| 4,837,422 A | 6/1989 | Dethloff et al. | |
| 5,276,311 A | 1/1994 | Hennige | |
| 5,578,808 A | 11/1996 | Taylor | |
| 5,590,038 A | 12/1996 | Pitroda | 705/41 |
| 5,649,118 A | 7/1997 | Carlisle et al. | |
| 5,751,949 A * | 5/1998 | Thomson et al. | 726/4 |
| 5,826,243 A | 10/1998 | Musmanno et al. | |

(Continued)

OTHER PUBLICATIONS

Anonymous. "A Web O-Card Secures Debit Using Credit." Bank Network News, vol. 18, No. 22, Apr. 13, 2000.

(Continued)

*Primary Examiner* — Susanna M Meinecke Diaz
(74) *Attorney, Agent, or Firm* — Snell & Wilmer L.L.P.

(57) ABSTRACT

The present invention provides a system and method for providing and/or facilitating complete on-line payment services while protecting the privacy of the transaction participants. The comprehensive payment service is based upon a consolidated account used to store value acquired through on-line transactions. The invention provides private payment numbers for protecting the identities of the participants and includes processes for authenticating participants, authorizing transactions, and settling payments. Thus, the present invention enables merchants to effectively accept non-standard forms of payment without changing their current payment infrastructures and enables the provision of value for purchases at any network merchant using any source of value.

20 Claims, 7 Drawing Sheets

U.S. PATENT DOCUMENTS

| | | | |
|---|---|---|---|
| 5,875,437 A | 2/1999 | Atkins | |
| 5,884,271 A | 3/1999 | Pitroda | |
| 5,911,135 A | 6/1999 | Atkins | |
| 5,963,924 A | 10/1999 | Williams et al. | |
| 6,014,635 A | 1/2000 | Harris et al. | |
| 6,014,646 A | 1/2000 | Vallee et al. | |
| 6,032,134 A | 2/2000 | Weissman | |
| 6,032,136 A | 2/2000 | Brake, Jr. et al. | |
| 6,038,551 A | 3/2000 | Barlow et al. | |
| 6,108,641 A | 8/2000 | Kenna et al. | |
| 6,138,107 A | 10/2000 | Elgamal | 705/39 |
| 6,189,787 B1 | 2/2001 | Dorf | |
| 6,223,168 B1 | 4/2001 | McGurl et al. | |
| 6,295,522 B1 | 9/2001 | Boesch | 705/41 |
| 6,473,500 B1 | 10/2002 | Risafi et al. | 379/144.01 |
| 6,594,640 B1* | 7/2003 | Postrel | 705/14.27 |
| 7,006,993 B1 | 2/2006 | Cheong et al. | 705/38 |
| 7,155,411 B1 | 12/2006 | Blinn et al. | 705/40 |
| 7,383,223 B1* | 6/2008 | Dilip et al. | 705/39 |
| 7,483,856 B2* | 1/2009 | Likourezos et al. | 705/39 |
| 7,636,696 B1* | 12/2009 | Sigler et al. | 705/74 |
| 7,783,566 B2* | 8/2010 | Armes et al. | 705/40 |
| 2001/0026609 A1 | 10/2001 | Weinstein et al. | 379/93.01 |
| 2002/0055909 A1 | 5/2002 | Fung et al. | 705/42 |
| 2002/0069122 A1 | 6/2002 | Yun et al. | 705/26 |
| 2002/0077978 A1 | 6/2002 | O'Leary et al. | 705/40 |
| 2002/0116331 A1* | 8/2002 | Cataline et al. | 705/39 |
| 2002/0143674 A1* | 10/2002 | Beckman | 705/34 |
| 2002/0174030 A1 | 11/2002 | Praisner et al. | 705/26 |
| 2004/0044627 A1* | 3/2004 | Russell et al. | 705/50 |
| 2004/0049458 A1* | 3/2004 | Kunugi et al. | 705/40 |
| 2005/0108149 A1 | 5/2005 | Bent et al. | 705/38 |
| 2007/0136169 A1 | 6/2007 | Dilip et al. | 705/35 |

OTHER PUBLICATIONS

Foss, Bradley. "Automatic bill payment offers convenience, punctuality." Daily Breeze. Torrance, Calif.: Mar 19, 201. p. E.4.

"The Gift Certificate Company and WildCard Systems to Provide Stored Value Gift Cards to Malls Nationwide." PR Newswire. New York: Apr. 24, 2001. p. 1.

"The world of virtual currency." The Hindu. Chennai: Aug. 31, 2000. p. 1.

International Search Report dated Sep. 4, 2003 in Application No. PCT/US2002/020262.

International Preliminary Examination Report dated Sep. 13, 2004 in Application No. PCT/US2002/020262.

USPTO; Office Action dated Mar. 9, 2007 in U.S. Appl. No. 10/176,729.

USPTO; Requirement for Restriction/Election dated Sep. 7, 2007 in U.S. Appl. No. 10/176,729.

USPTO; Final Office Action dated Mar. 17, 2008 in U.S. Appl. No. 10/176,729.

USPTO; Advisory Action dated Aug. 4, 2008 in U.S. Appl. No. 10/176,729.

USPTO; Office Action dated Oct. 31, 2008 in U.S. Appl. No. 10/176,729.

USPTO; Final Office Action dated Jul. 21, 2009 in U.S. Appl. No. 10/176,729.

USPTO; Advisory Action dated Nov. 9, 2009 in U.S. Appl. No. 10/176,729.

USPTO; Office Action dated Dec. 24, 2009 in U.S. Appl. No. 10/176,729.

USPTO; Notice of Allowance dated Apr. 22, 2010 in U.S. Appl. No. 10/176,729.

* cited by examiner

CONSOLIDATED PAYMENT ACCOUNT SYSTEM AND METHOD

CROSS REFERENCE TO RELATED APPLICATIONS

This application is a continuation of, and claims priority to, U.S. Ser. No. 10/176,729, filed on Jun. 21, 2002 and entitled "CONSOLIDATED PAYMENT ACCOUNT SYSTEM AND METHOD." The '729 application claims benefit from U.S. Provisional Patent Application Ser. No. 60/301,337, filed Jun. 27, 2001 and entitled "CONSOLIDATED PAYMENT ACCOUNT SYSTEM AND METHOD," Both of which are hereby incorporated by reference.

FIELD OF INVENTION

The present invention relates generally to systems for facilitating transactions, and more specifically to systems for facilitating secure payment and funding services using a pre-funded account and protecting the privacy of the transaction participants.

BACKGROUND OF THE INVENTION

The advent of on-line commerce has created a need for non-traditional payment and funding vehicles to enable consumers to reliably transfer value to merchants in exchange for goods or services. Although a variety of non-standard payment vehicles have recently become available, to use these non-traditional payment services causes a variety of disadvantages.

Historically, merchants and consumers transacting business had done so together in a single physical location. Accordingly, consumers were able to easily transfer value to merchants in the form of tangible objects such as coins or currency. In time, various institutions developed alternative services for facilitating transfers of value between consumers and merchants. Such services eliminated the necessity to transfer a tangible object and offered the alternative of merely providing information sufficient to enable the merchant to acquire the necessary value from a reliable third party, such as a financial institution. Eventually, it became common for consumers to present bank drafts, plastic cards (e.g., credit cards, debit cards, or the like), or other physical objects containing the information to merchants. The consumer's possession of the card coupled with some identifying indicia on the card or another form of identification such as a driver's license served to reduce fraud. In effect, consumers facilitated transactions by merely presenting sufficient information to identify their financial institution and a particular account at that institution from which a designated amount of value could be transferred.

Through widespread use of such cards and bank drafts, a payment process evolved to facilitate transactions. In this traditional payment process, a consumer would present a financial instrument to a merchant, which would send the financial instrument, or the information therefrom, to an acquirer. The acquirer would pay the merchant and forward the instrument, or information, to the instrument's issuer, who would bill the consumer. Finally, the acquirer and the issuer would settle according to the various discounts and fees due each.

Eventually, an extensive payment infrastructure was developed comprising communication links between merchants, financial institutions, and consumers. This payment infrastructure is adapted to facilitating the traditional payment process quickly, reliably, and efficiently. Further, while the infrastructure has evolved and been refined, financial institutions participating in the infrastructure have also developed many additional varied financial instruments specifically tailored to be used in conjunction with the payment infrastructure.

In addition, many institutions now make available additional sources of value that may be used in conjunction with coin, currency, and cash to facilitate transactions. For example, consumers may redeem certificates for discounts, rebates, rewards, and/or loyalty points. Often, such certificates may be combined with another source of value to reduce the out-of-pocket cost to the consumer. In most cases, however, to use a certificate requires the consumer to provide a document or other tangible object to the merchant that describes the terms of the offer and how it is funded or may be redeemed by the merchant.

With the advent of on-line commerce, the common lack of physical proximity between the consumer and the merchant has rendered transfers of cash and other tangible objects nearly obsolete. Accordingly, demand has increased significantly for alternative payment and funding vehicles to enable consumers to reliably transfer value to providers of goods or services.

In response to this need, a variety of non-standard payment vehicles have recently become available to facilitate on-line transactions. For example, several private cash vendors such as Flooz, Beenz, InternetCash, and the like have recently introduced their services to on-line consumers and merchants. Unfortunately, however, to use these non-traditional payment services requires merchants and consumers to adapt to varied and non-traditional payment infrastructures. In addition, most of the available non-standard online payment products have required merchants to adopt new authorization and settlement processes and have failed to adequately take advantage of the existing payment infrastructures used for the more traditional forms of payment, such as credit, debit, charge cards and cash. As a result, these non-traditional payment services have had minimal success or have failed to gain significant acceptance in the marketplace, and new entrants may be destined for failure.

The lack of universal merchant acceptance of the varied instruments now held by consumers limits and unnecessarily complicates the payment choices available to consumers. For example, some merchants may accept cards from only one preferred issuer, and if a consumer does not hold that instrument, the consumer must either avoid that merchant or acquire an instrument that the merchant will accept. In many cases, these choices are unacceptable and may produce a disadvantageous situation. For example, a consumer may be forced to forego their use of an advantageous loyalty program or preferential interest rate.

The advent of on-line commerce has also helped to enable merchants as well as payment service providers to collect and analyze extensive data regarding the purchasing and payment characteristics of consumers and the sales and collection characteristics of merchants. While these data collection capabilities may be desirable and may offer certain advantages to some participants, to others they present an infringement upon the participants' expectation of privacy. Some consumers simply do not want merchants or payment service providers to be able to collect information regarding their purchasing and/or payment characteristics or even the identity of the participants to their transactions. Similarly, some merchants simply do not want payment vehicle service providers, especially those closely affiliated with the merchants' creditors, to be able to collect data regarding the merchants' sales and/or collection histories.

In partial response to these problems, a variety of systems currently exist for inserting an account between a merchant and a payment vehicle service provider (i.e., U.S. Pat. Nos. 6,014,646; 6,032,136; 5,826,243; 5,963,924; 6,189,787 and 6,223,168). Unfortunately, however, these systems do not always allow consumers to use their desired payment vehicle service provider, or value source. Moreover, none of these systems substantially protects the privacy of the participants while providing a complete payment service, from authentication of the participants to authorization of the transaction to settlement of the payment.

Further, attempts to simply adapt traditional card-based purchase transactions leave many problems unsolved. For example, the use of traditional card payment systems may present difficulties whenever a consumer desires to use more than one financial instrument at a time to pay for a particular purchase. In such situations, the consumer will receive separate statements, each describing only a portion of the activity related to that purchase. As a result, the consumer must manually consolidate and integrate the information from the various statements to view the total records of the transactions reflected therein.

Accordingly, it would be advantageous to have a payment vehicle whereby merchants could effectively accept payments funded by one or more non-standard sources of value without changing their standardized and widely accepted payment infrastructures. It would also be advantageous to have a payment vehicle that could be used to provide value for purchases at any network merchant using any desired source of value. It would further be advantageous to have a system for providing or facilitating a complete payment service, from authentication of the participants to authorization of the transaction to settlement of the payment, while simultaneously protecting the privacy of the participants.

SUMMARY OF THE INVENTION

The present invention provides a system and method for providing and/or facilitating complete on-line as well as off-line payment services while simultaneously protecting the privacy of the transaction participants. The comprehensive payment service is based upon a consolidated account that stores value to be used in on-line and off-line transactions. The invention also protects the identities of participants and includes processes for authenticating participants, authorizing transactions, and settling payments. As such, the present invention enables merchants to effectively accept non-standard forms of payment without changing their current payment infrastructures. The present invention also enables the provision of value for purchases at any network merchant using a variety of sources of value.

As used herein, the term on-line transaction refers to a transaction wherein a remotely situated consumer communicates with a merchant or with the transaction administrator to authorize the transaction administrator to cause a payment to be made to the merchant from a consolidated account. Such transactions may be considered to have occurred at a merchant's "virtual" store. As also used herein, the term off-line transaction refers to a transaction in which a consumer presents a card to a merchant, such as in the merchant's physical place of business, so that the merchant may communicate with the transaction administrator to request a payment to be made to the merchant from the consolidated account.

BRIEF DESCRIPTION OF EXEMPLARY DRAWINGS

The above-mentioned objects and features of the present invention can be more clearly understood from the following detailed description considered in conjunction with the following drawings, in which like numerals represent like elements and in which.

DETAILED DESCRIPTION OF EXEMPLARY EMBODIMENTS

Figure 1:
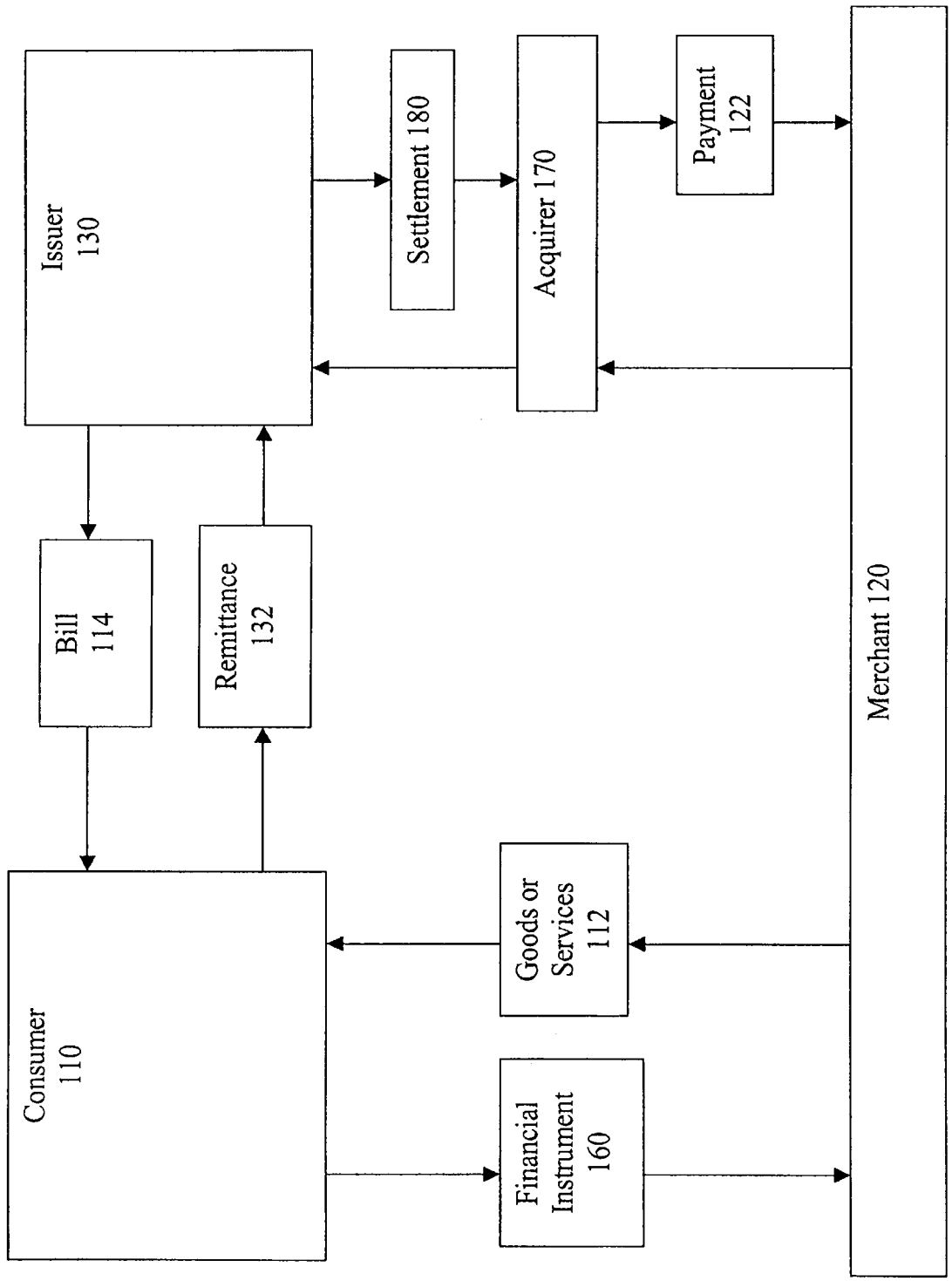
FIG. 1 illustrates a conventional payment system.

As more fully explained herein, the present invention is a payment and funding vehicle that is configured to accommodate, consolidate, and store value from various sources into a single consolidated account. These sources of value (e.g., funding sources) may include charge cards, credit cards, debit cards, gift cards, stored value cards, telephone cards, loyalty cards, financial accounts, electronic funds transfer accounts and/or the like and may be accessed through relationships with multiple issuers such as American Express, Visa, banks, loyalty companies, other third parties and/or the like. In addition to the sources described above, wherein the funds are typically moved in response to an explicit request from the cardholder, a consolidated account may also receive funds that may be pushed into the consolidated account in response to an external trigger or condition. Such triggers may be configured to accommodate recurring payments (e.g., mortgage payments, car payments, insurance payments and the like) or for unanticipated purchases (e.g., overages or unanticipated fees and/or assessments). Finally, these triggers may take the form of sweep accounts, or overdraw/insufficient funds requests or other triggers that do not involve any explicit request from the cardholder.

Through the consolidated account, consumers are enabled to use any value source (e.g., payment instrument) to which they have access to fund their account and pay for their purchases. The invention also enables participants to take advantage of existing payment infrastructures currently in use within each financial institution's merchant network by effectively extending greater payment choices and capabilities to consumers. The merchant may continue to interact with an apparently traditional account, but how that account is enabled may be defined by the consumer, free from traditional limitations. Accordingly, the consolidated account offers many of the attributes of a traditional wallet where multiple payment products are available for use by the consumer for use in completing a purchase transaction. The consolidated account, however, has the additional attribute that it may act as a stored value account that is funded before it is used. Therefore, in accordance with the present invention, the consumer may choose how to fund the consolidated account, using one or several different instruments from one or many different issuers. Thus, one exemplary use of the consolidated account is analogous to the consumer acquiring funds from a cash advance, one or more financial instruments, cash, and/or one or more asset backed credit cards, then storing the acquired funds in an account, then accessing the stored funds (e.g., value) to settle payment for a purchase. To merchants, the consolidated account appears as a traditional instrument from which to acquire payments, while to consumers the consolidated account takes the place of the traditional issuer, i.e., provides a vehicle for executing payments, while being able to store value acquired from any number and/or combination of the consumer's designated sources, including any financial instruments that can be used to execute payments.

FIG. 1 illustrates a conventional payment system. As discussed above, in the typical payment chain, the consumer 110 presents a financial instrument 160 to a merchant 120 in exchange for goods or services 112. The merchant 120 then sends the transaction on to its acquirer 170, which in turn forwards it onto the instrument's issuer 130. The issuer 130 sends a bill 114 to the consumer 110, who returns a remittance 132 to the issuer 130. The acquirer 170 effects payment 122 to the merchant 120, and the acquirer 170 and issuer 130 effect settlement 180 according to the different discounts and fees that are due to each entity.

Figure 2:
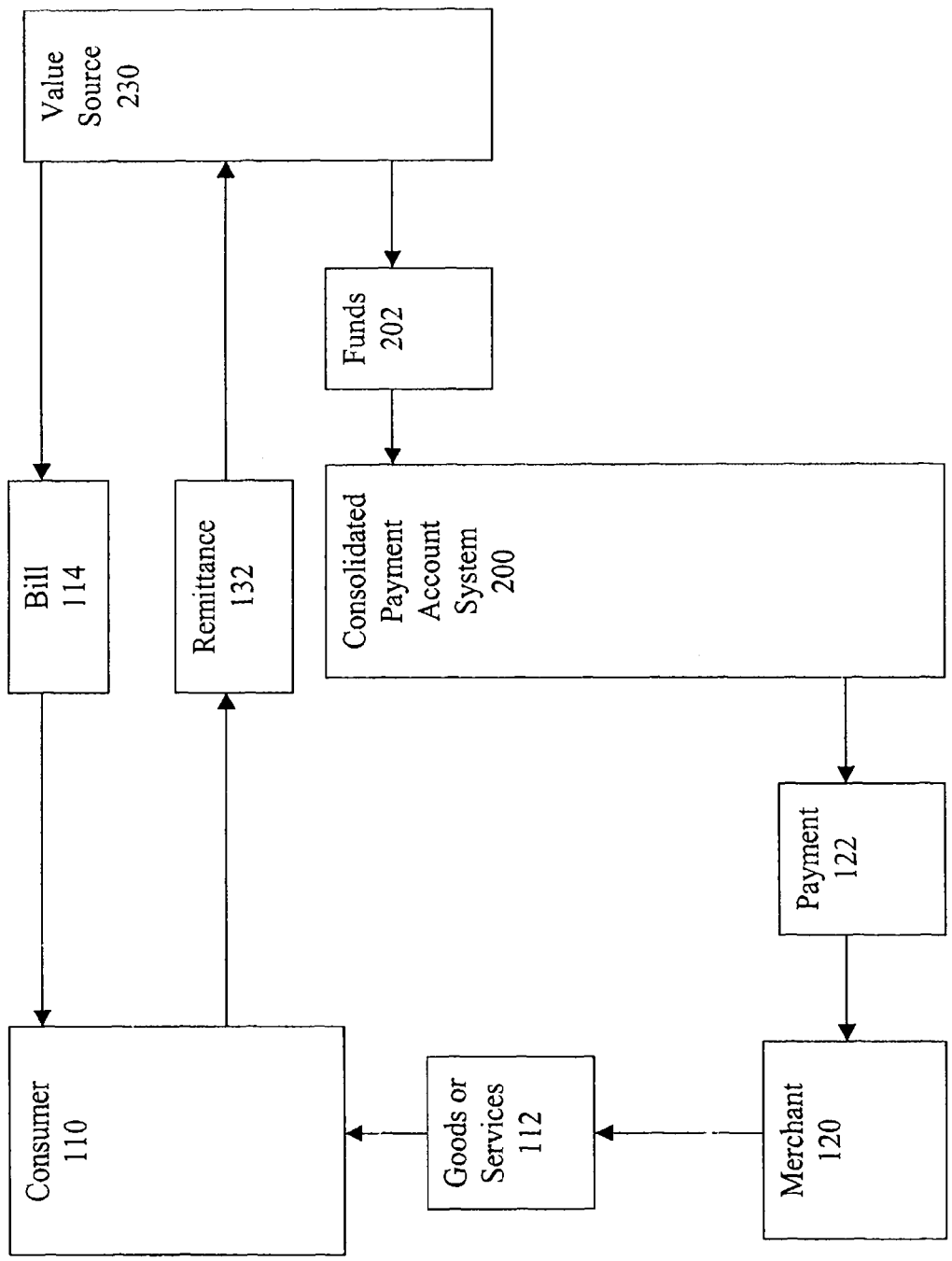
FIG. 2 illustrates the external flow of information surrounding an exemplary consolidated payment account system.

FIG. 2 illustrates the external flow of information surrounding an exemplary consolidated payment account system. In this exemplary embodiment, the conventional process flow is changed and/or supplemented by inserting the consolidated payment account system 200 between the merchant 120 and the financial instrument (i.e., the issuer) 230 that funds the account to enable the payment 122. In this case, the value source 230 provides funds 202 to the consolidated payment account system 200, which provides the payment 122 to the merchant 120. Therefore, in one embodiment, rather than directly paying the merchant 120, the system balances the transaction by executing a stored value fund request that is based upon value received from a funding instrument and that has been stored in the consolidated account. As such, the consumers' behavior is partially or fully hidden from the issuer of their financial instruments as all payments are made to and from the consolidated account. In this form, the account serves as a proxy for the funding instrument as well as the merchant. To a merchant, the consolidated account represents the traditional acquirer. To a consumer, the consolidated account represents the traditional issuer.

In on-line implementations of the instant invention, each participant is equipped with a computing system. The consumer has a computing unit in the form of a personal computer, although other types of computing units may be used including laptops, notebooks, hand held computers, set-top boxes, and the like. The merchant has a computing unit implemented in the form of a computer-server, although other implementations are possible. The transaction administrator, the account administrator, and the value source each may be implemented as a computer, which may be a main frame computer or which may be implemented in other forms, such as mini-computers, PC servers, a network set of computers, and the like.

The merchant computer, the consumer computer, and transaction administrator computers may be interconnected via a network, referred to as a payment network. The payment network represents a combination of existing proprietary networks and non-proprietary networks that presently accommodate transactions for credit cards, debit cards, and other types of financial/banking cards. The payment network may be a closed network, assumed to be secure from eavesdroppers, and in an alternative embodiment, may include any open network, such as the internet. A consumer may communicate with the system through a computer network, a telephone, or a physical device such as card reader configured to receive information from a card when a magnetic strip on the card is swiped past the card reader. Examples of the payment network include the American Express®, VisaNet® and the Veriphone® network. In addition, the transaction administrator, the account administrator, and the value source may also be interconnected via a network, commonly referred to as a funding network. Accordingly, the consolidated payment account system comprises a payment network and a funding network.

In an exemplary embodiment, the consolidated payment account system is implemented as computer software modules loaded onto the consumer's computer, the merchant's computer, the transaction administrator's computer, the account administrator's computer, and the value source's computer. In an exemplary embodiment, the merchant computer, the consumer computer, and the value source computer do not require any additional software (beyond what is required to accomplish traditional on-line transactions) to participate in the online commerce transactions supported by the consolidated payment account system. The additional facilitating software is implemented on the transaction administrator's computer and the account administrator's computer.

Although labeled as a "bank" or a "value source," the bank or value source may represent other types of issuing institutions, such as credit card companies, card sponsoring companies, or third party issuers under contract with financial institutions. In addition to issuing financial instruments, a bank or value source may provide value comprising non-financial instruments such as loyalty points, rewards, or coupons. It is further noted that other participants may be involved in some phases of the transaction, such as an intermediary settlement institution, but these participants are not shown.

An "account number", as used herein, includes any device, code, or other identifier/indicia suitably configured to allow the consumer to interact or communicate with the system, such as, for example, authorization/access code, personal identification number (PIN), Internet code, other identification code, and/or the like which is optionally located on a rewards or incentives card, charge card, credit card, debit card, prepaid card, telephone card, smart card, magnetic stripe card, bar code card, and/or the like. The account number may be distributed and stored in any form of plastic, electronic, magnetic, and/or optical device capable of transmitting or downloading data from itself to a second device. A consumer account number may be, for example, a sixteen-digit value source identifier such as a credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the consumer.

Although referred to as an account, the invention may represent a complete payment service encompassing all involved processes from authentication of the participants to authorization of the transaction to settlement of the payment. The consolidated account may be established as virtual account, but can also be offered and distributed as a plastic card to be managed and/or supported by an issuer, and can further be branded for and distributed by a third party. It should be noted that the consolidated account may be used to facilitate online transactions as well as transactions conducted at storefronts using plastic that has been distributed for the consolidated account.

In addition, the consolidated account may be configured to accommodate or override the requirements of the underlying dependent financial instruments at the direction of the account administrator. If there are usage restrictions or limitations in place for a particular payment product, those same controls (if known) optionally may be enforced by the consolidated account. Thus, the present invention may provide a single interface or entry-point for using different types of payment products into a merchant network, without bypassing, eliminating, or interfering with such controls, if desired. For example, if a particular payment product is restricted to use at only a restricted set of approved merchants, then, upon funding, either wholly or partially, from the particular payment product, the consolidated account may disable itself from being used at non-approved merchants.

Additionally, since the consolidated account is an account, different features that can be attached to the account can be developed and offered to the consumer to customize the base product for their use. Additional products and services that can be developed and layered on the base payment product including loyalty programs, private payments (i.e., payments that use a proxy number in place of a main account number), secure (cardmember present) payments, electronic gift certificates, private billing and shipping and any new products and/or services that are implemented within or leverage the existing payment infrastructure. It should be noted that various loyalty programs could be attached to the consolidated account to incent and encourage use of the account by cardholders.

As such, this invention takes advantage of the existing payment infrastructure, enabling relationships with the merchant network to be used while minimizing requirements for changes. Moreover, the consolidated account can be used for all direct interactions with a merchant regardless of the type of payment being used to provide value (e.g., fund the account) for a particular purchase. The consumer is able to use a form of payment that is convenient and practical for them, not limited by the merchants' ability to interact with a product. This offers the consumer flexibility and privacy, while simplifying the demands on the merchant. Accordingly, the disparate preferences of a merchant and a consumer simultaneously may be satisfied.

Since all payments flow through the consolidated account (i.e., temporarily exist as value used to fund or be stored in the consolidated account prior to payment to the merchant), any payment product configured to provide value to be stored in the consolidated account (i.e., to fund the consolidated account) can be used by the consumer as a payment mechanism. In an exemplary embodiment, the consolidated account may be configured to shield the identity of the payment product, i.e., funding source, from the merchant. Although shielding the identity of the funding source from the merchant precludes the merchant from verifying whether the funding card is present, i.e., establishing a card-present condition, a level of risk normally commensurate with a card-present condition may nevertheless be achieved. This is because a consolidated account issuer may accrue experience relating to the performance of the particular user of the consolidated account, i.e., the reliability of that user and the designated funding source in providing adequate funding for the consolidated account. Accordingly, the decreased level of risk normally associated with a card-present condition for a funding source card may be achieved by virtue of the authentication of the consolidated account—despite the absence of that funding source card.

The consolidated account solution is also advantageous because network merchants already accept traditional transaction card products (such as American Express, Discover, Visa, or MasterCard) and can authorize and settle against those accounts using the same processes the merchants currently use. Moreover, consumers can use all traditional and new forms of payments to fund the consolidated account, enabling those payment forms to effectively be used for purchases at any network merchant. Thus, the consolidated account may extend benefits associated with a specific issuer, e.g., private payments, loyalty programs and secure payments, to those who do not have the issuer's card account or financial instrument. Moreover, the consolidated account effectively enables use of specific instruments or types of instruments at merchant locations that do not typically accept the specific instruments or types of instruments. The invention is also configured to enable a service provider to customize payment solutions for third parties (e.g., parties other than the transaction administrator) and to distribute those solutions through the third party. For example, a third party could issue a consolidated account based upon a plastic card that could be used either at its online merchants or at any of its designated physical locations. As a result, the consolidated account may be used to reward certain types of spending behavior (e.g., online purchasing) while still enabling universal use in a physical environment. At the same time, the instant invention enables the cardholder to hide his true identity and enables the use of private billing or shipping mechanisms, thereby providing greater privacy to the cardholder.

As a further advantage, the instant invention may facilitate an acquisition of an issuer of incompatible instruments without requiring the conversion of the acquired accounts. For example, in accordance with the invention, an issuing institution that acquires another issuing institution may permit the acquired institution to continue to issue whatever instruments they had been issuing regardless whether the instruments of the acquired institution are compatible with those of the acquiring institution. Through a consolidated account, the acquired institution may continue to issue the incompatible instruments while the underlying consolidated account may use the statementing and servicing facilities of the acquiring product.

As discussed above, the present invention accommodates payment products from, for example, charge cards, credit cards, debit cards, gift cards, stored value cards, telephone cards, loyalty cards, financial accounts, electronic funds transfer accounts and/or the like as well as card issuers such as, for example, American Express, Visa, MasterCard or private cash companies such as InternetCash or Flooz, or even other vendors such as Microsoft, AOL, Yahoo, and the like to be used within an unmodified merchant network. Access to a merchant network with the consolidated account provides greater choice by the consumer regarding how they will pay for purchases, even if the consumer does not possess a specific payment product or any payment product at all.

The system also supports other payment forms that have evolved from, and are more prevalent, online. These other payment forms include, for example, subscription or recurring payments for renewable, sweep accounts, periodic services, as well as micro-payments for location-based (i.e., dispensing machines, parking meters, and the like) or digital rights management services such as those providing music and/or software. Management of the micro-payments may include aggregation for settlement with the merchant and transaction viewing by the consumer. In addition, the system facilitates integrated statementing and may be configured to draw funds from a designated source or set of sources into the consolidated account on a specified schedule. Alternatively, the designated source or set or sources could be scheduled to place funds into the consolidated account according to a predetermined schedule. In addition to scheduled value transfers, the system may be configured to accommodate condition-based triggers, which enable the system to respond to unanticipated needs for value.

In an exemplary embodiment, a consolidated account may be funded from a plurality of funding sources, and the order and proportion in which value is acquired from each of the sources may be determined according to a user-defined funding profile. In accordance with this embodiment, a user may define one or more value sources from which value will be drawn and may specify a set of one ore more rules by which the value will be acquired from those sources. For example, a user or issuer may specify a set of static rules, e.g., a limit that may not be exceeded for a particular source, an order or proportion in which funds may be drawn from the plurality of sources, or the like. Further, dynamic rules may be defined by the user or the issuer that depend upon one or more variables that may be monitored by the system, such as current interest rates associated with each value source, current balance in each value source, availability of funds, statement cut-off date, transaction date, type of merchant or product or service, or any other similar set of criteria desired by a user or issuer.

In the case of micro-payments, the consolidated account may be used to pay for a series of purchases of goods and/or services, then to aggregate the individual charges into a larger transaction to be settled in a single aggregate payment to the merchant. The funding for the micro-payments could be acquired in a variety of ways as discussed previously. The system enables production of an aggregated statement, providing significant cost advantages over production of multiple individual statements. In addition, a threshold may be placed on the micro-payments to limit spending on specific products, categories of products, services, categories of services, merchants, and/or groups of merchants. The system may also be configured to automatically fund micro-payment purchases.

As described above with respect to the aggregation of micro-payments, the consolidated account provides the ability to report all activity through the consolidated account, regardless of the source, on a single statement. For example, if a consumer uses a Visa card, an Amex green card, and a bank debit card to fund the consolidated account, then uses the consolidated account to pay for purchases during a particular month, then a consolidated statement can be produced showing the shared activity.

In addition, the platform can also be used as an interface with merchants to facilitate the use of proprietary payment services such as Flooz, Beenz, and InternetCash and the like. Similarly, the platform can be used by merchants as an interface to facilitate use of varied payment forms. When the system is used, the source of the funds for the payment is fully or partially hidden from the merchant, and the unique characteristics of the source of funds are not transmitted to the merchant, since interaction occurs only through the consolidated account.

Figure 3:
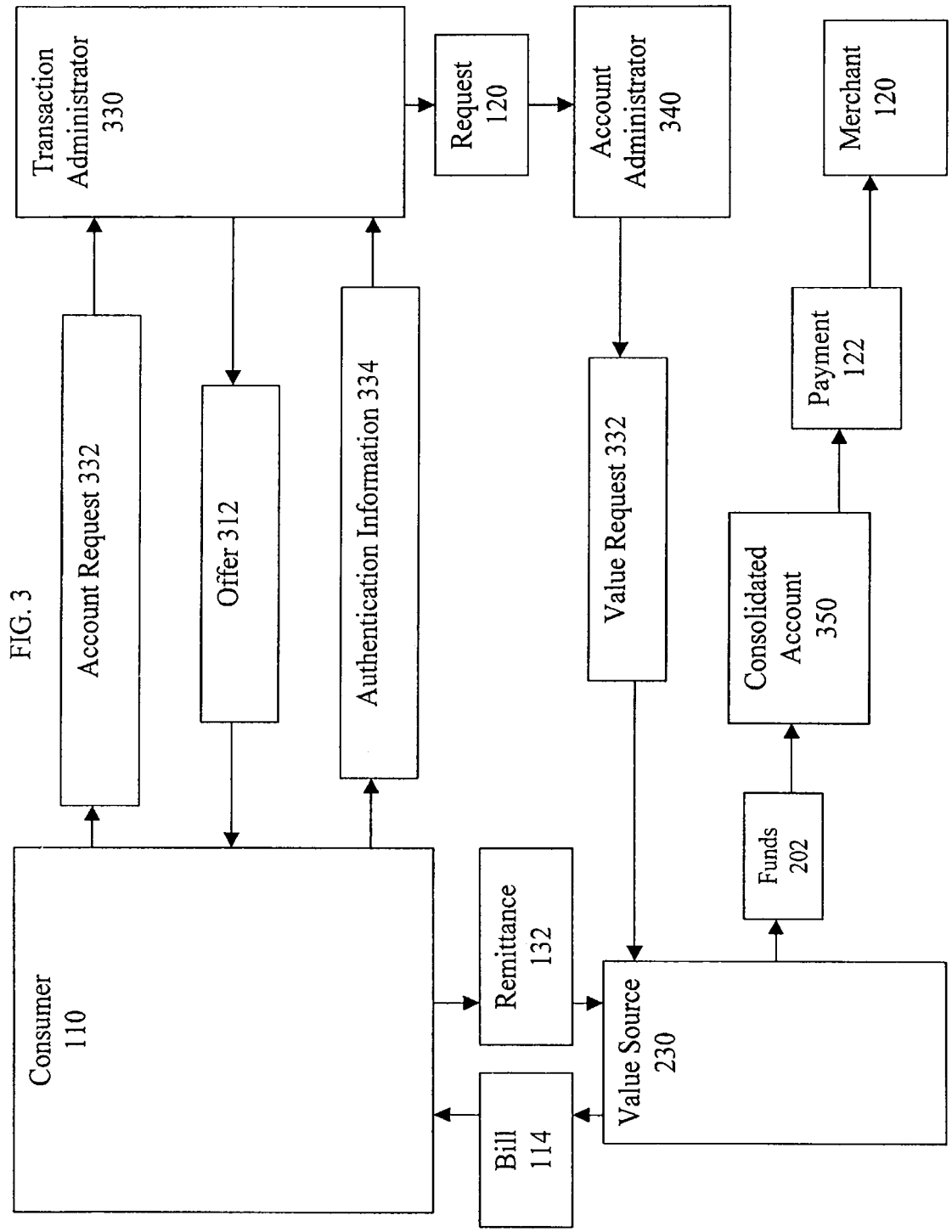
FIG. 3 illustrates the flow of information within an exemplary consolidated payment account system in conjunction with an exemplary process for authenticating a consumer and storing value in a consolidated account.

FIG. 3 illustrates the flow of information within an exemplary consolidated payment account system in conjunction with an exemplary process for authenticating a consumer and storing value (e.g., funding) a consolidated account to facilitate transactions for value using the consolidated account. The system that executes the described processes includes a consumer 110, a merchant 120, a transaction administrator 330, an account administrator 340 and a value source 230. The consumer 110 acts in concert with a merchant 120 to communicate with the transaction administrator 340 in a similar fashion as is currently accomplished when using conventional credit card payment systems. For example, a consumer 110 wishing to pay for goods and/or services at a participating merchant 120 site typically presents a credit card to the merchant or swipes the card at the merchant site. By doing so, the consumer 110, and/or the merchant 120 acting on behalf of the consumer 110, initiates communication with the creditor, which is analogous to the transaction administrator 330 of the instant invention. In conventional systems, the creditor may respond by verifying that the consumer 110 has sufficient value available in the account to fund the purchase, and if so, may provide an authorization code to the merchant 120 to assure the merchant 120 of receiving value for the goods and/or services provided to the consumer 110. The creditor, then, follows up by billing the consumer 110 and paying the merchant 120.

In the instant invention, however, the transaction administrator 330, while interfacing with the merchant 120 in a conventional manner, such as by providing an authorization code, does not perform the follow up of billing the consumer 110 for the value ultimately provided to compensate the merchant 120 for his provision of goods and/or services. Instead, the transaction administrator 330 acts in concert with an account administrator 340 to delegate the billing and collection duties to a value source 230. The transaction administrator 330 still follows up by compensating the merchant 120, but does not perform the task of billing the consumer 110. Put another way, the consolidated account is concerned with payments, not collections. As a result, identity of the consumer's source of funds is shielded from the merchant 120. By accepting value from a variety of value sources 230, such as banks and/or other issuers of credit, the consolidated account system is relieved of the burdens associated with providing individual credit and collection functions. Moreover, the consolidated account may be configured for single use or multiple use, being capable of funding once or many times from a single source or from many sources.

As shown in FIG. 3, the process of establishing and/or funding a consolidated account may be initiated by a consumer 110 first communicating an account request 332 to the transaction administrator 330. The transaction administrator then responds by communicating an offer 312 to the consumer 110 to provide a consolidated account 350 for storing value 202. If the consumer 110 accepts the offer 312, the transaction administrator 330 responds by collecting authentication information 334, including, for example, demographic information and the consumer's designated source of value 230 for retrieving value to be stored in the consolidated account 350, from the consumer 110. The designated source of value 230 may comprise any combination of one or more sources of value including, but not limited to, financial instruments such as, for example, charge cards, credit cards, debit cards, gift cards, stored value cards, telephone cards, loyalty cards, financial accounts, electronic funds transfer accounts and/or the like. The transaction administrator 330 may also proceed by identifying, and/or verifying the identity of, the consumer 110. This step of obtaining and/or verifying the consumer's identity may be accomplished through a variety of means that are known in the art including, but not limited to, use of private databases, credit bureau databases, transmission of biometric data, transmission of "hand-shake" data (i.e., smart card signature, challenge/response, etc) and/or the like. Examples of online authentication are disclosed in U.S. Ser. No. 09/952,490 "Microchip-Enabled Online Transaction System", filed Sep. 12, 2001, with inventors Anant Nambiar and Geoffrey Stern, which is hereby incorporated by reference. Thus, the authentication information is collected for the purpose of establishing the consolidated account and defining its ownership. It should be noted that since there are no credit requirements for the account, the account could be established anonymously or alternatively may require an identity. It should also be noted that, although the instant invention may be embodied as a microchip enabled device, it may also be configured as a virtual and not a physical (e.g., plastic) account, which may not accommodate a microchip.

Upon positive verification, the transaction administrator 330 proceeds by communicating the request to create the consolidated account 350, together with the requisite information (i.e.; name, physical address, email address, personal identifiers such as social security number, and any information similar to that needed to establish any account) to an account administrator 340. Finally, the account administrator 340 communicates the request for value 332 to the consumer's designated value source 230. This request for value may include information typical of standard funding requests and should encompass data that would accompany any typical payment transaction (e.g., merchant number, card number, expiration date, amount, date of purchase, and the like). In an exemplary embodiment, a consolidated account enables a transaction administrator to effect payment to a merchant through existing payment and settlement infrastructures.

As mentioned briefly above, the invention solves or reduces several of the common transaction problems, such as privacy, security, and acceptance, involved in the direct use of traditional cards for making purchases or otherwise balancing transactions. In an exemplary embodiment, the consolidated account may be configured to define how, what and when information regarding a particular purchase, as well as information regarding a particular funding source, is used and by whom.

Privacy of the consumer 110 is enhanced as the consumer's actual payment method, used to provide value to fund the account and ultimately pay for the purchase, is shielded from the merchant. Additionally, information regarding where the purchase occurs and what is being purchased by the consumer 110, can be hidden from the cards' issuer (especially if the consolidated account 350 serves as a merchant proxy for the purchase). Security of the transaction and the consumers' different accounts is improved, as the only instrument that may be exposed to external parties is the consolidated account 350, thus protecting the consumer's other payment instruments. If attempts are made to use the consolidated account 350 fraudulently, the potential for loss may be easily mitigated. Because value can be stored in the consolidated account 350, in one embodiment, prior to a purchase, the value stored in the account can be managed at a low level, thereby limiting the exposed value and providing additional protection to the consumer 110 and merchant.

Figure 4:
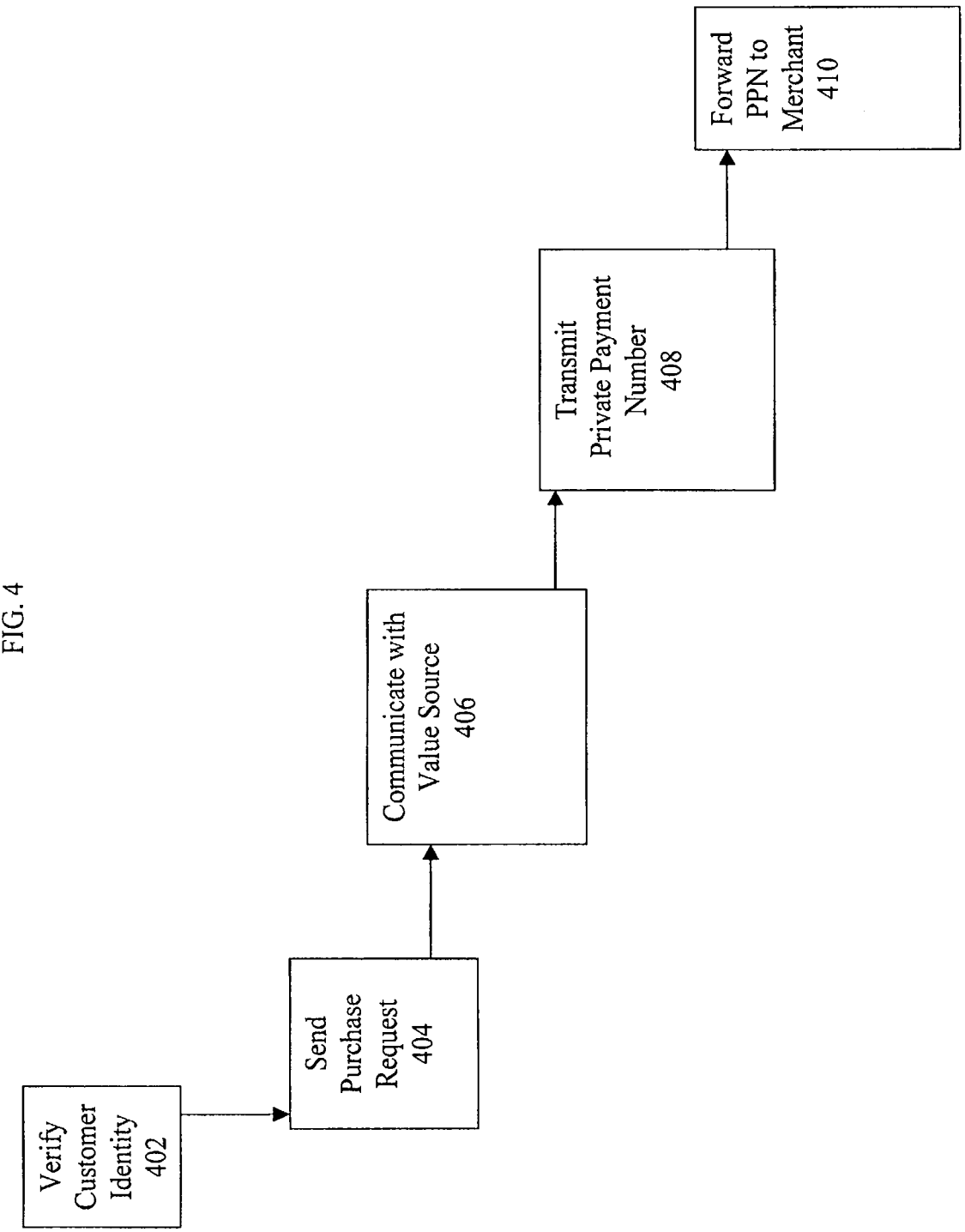
FIG. 4 illustrates an exemplary process for maintaining the privacy of the parties to a transaction for value using a consolidated account.

FIG. 4 illustrates an exemplary process for maintaining the full or partial privacy of the parties to a transaction for value using a consolidated account 350. As shown in FIG. 4, the present invention provides a method for shielding or partially shielding the identities of the parties to the transaction, also known as private payment blinding. In this exemplary embodiment, the transaction administrator 330 instructs an authentication engine to verify the identity of a consumer (step 402). The consumer 110 then requests a purchase at a website or other merchant (step 404), the purchase request also being communicated to the transaction administrator 330. In response, the transaction administrator 330 communicates the consumer's value source identifier, such as a credit card number or the like, to the designated value source (step 406). The value source 230 then communicates a proxy or private payment number to the transaction administrator (step 408), which forwards the private payment number to the website or merchant (step 410). Additional details related to the generation of a private payment number can be found in "System For Facilitating A Transaction", U.S. Pat. No. 7,627,531, issued on Dec. 1, 2009, (aka Ser. No. 09/800,461, filing date Mar. 7, 2001), which is hereby incorporated by reference. As such, the website or merchant receives value indirectly from the consumer's designated value source 230, but the identity of that value source 230 is not communicated to, and is thus shielded from, the website and/or the merchant. In other words, the website or merchant is blinded from the value source 230 without requiring any registration from the consumer 110. It should be noted that the use of a private payment number does not affect the interaction between the consolidated account 350 and the value source 230. The consolidated account serves as a blind for the underlying accounts that fund it. The private payment number may also be used to blind the consolidated account and any value present on it. Thus, when the private payment number is used in conjunction with the consolidated account, a double blind exists between the merchant and the underlying account. As a result, the private payment number adds an additional layer of shielding between the consolidated account and the merchant.

A private payment number is a limited use account number, and its use is effective to front the consolidated account number. Because only known consumers may use a private payment number, the consumer must authenticate their identity in order to establish the relationship between the two account numbers. In an exemplary embodiment, the authentication is typically a user id/password that is unique to the consumer and their consolidated account. Private payments reduces the exposure of the financial instrument on the public network.

It should be noted that the private payments process and the funding process of the instant invention are distinct. The funding of the consolidated account does not depend upon whether private payments is being used. In an exemplary embodiment, a consumer may fund a consolidated account through an online transaction. Then, the consumer may access the private payments site and request a private payment number for the consolidated account number. In response, the private payments system authenticates the consumer's identity and issues the private payment number to the consumer. The consumer may then access a merchant site and use the private payment number to purchase some goods or services. The settlement system then recognizes that the private payment number is a facade for the consolidated account and pays the merchant using funds from the consolidated account. As a result, the merchant only sees the private payment number, which carries no actual value in and of itself, but which is associated with the appropriate consolidated account.

In an exemplary embodiment, a consolidated account may facilitate gifting. For example, a first consolidated account may be funded by a second consolidated account. In accordance with this embodiment, one or more givers could use their consolidated account or another value source to fund a recipient's consolidated account. The recipient's consolidated account may be governed by a set of rules affecting the amount of funding, permissible merchants, types of merchants, goods, services, transaction dates, or the like.

Figure 5:
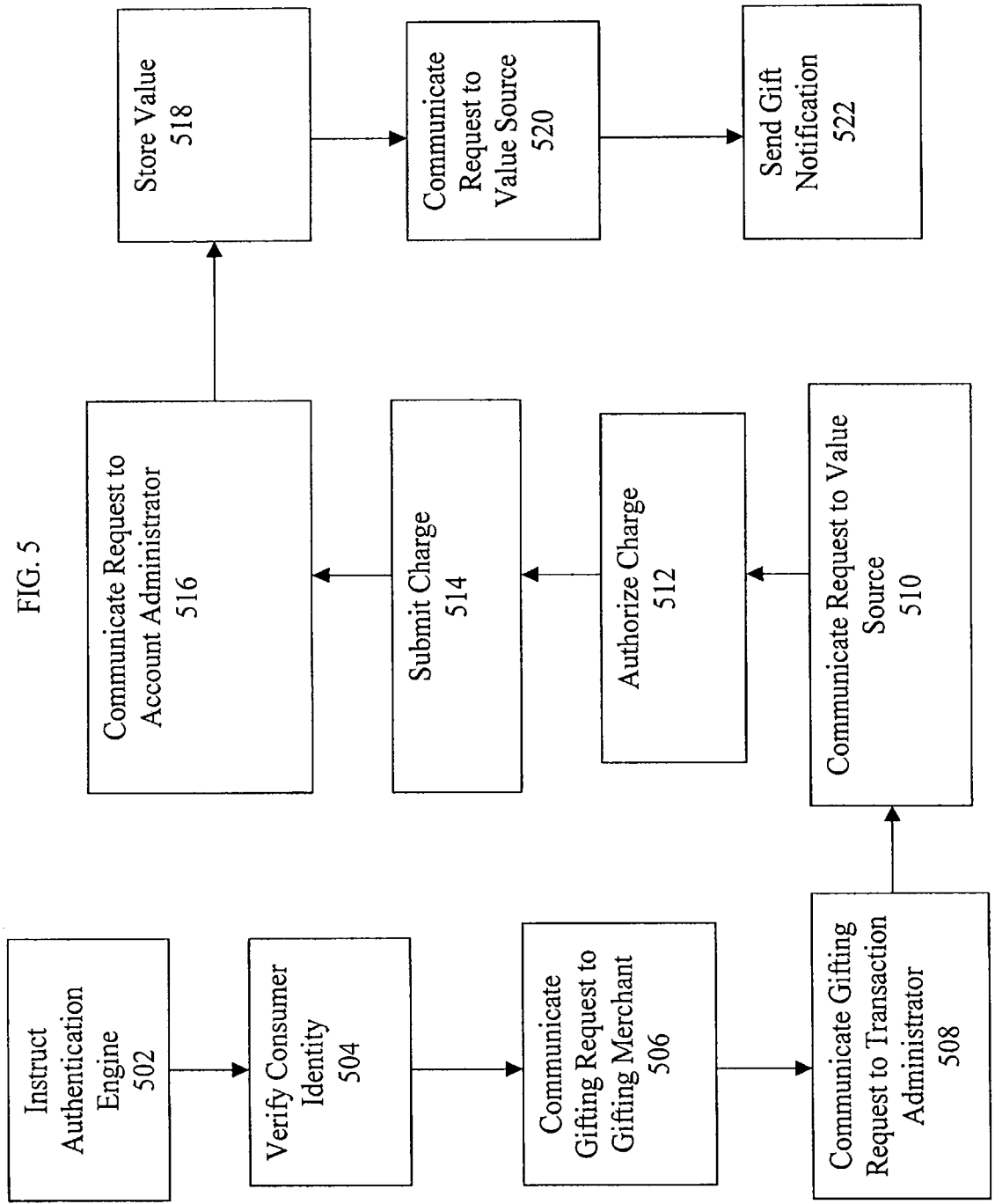
FIG. 5 illustrates an exemplary process for transferring a gift from one consumer to another consumer.

FIG. 5 illustrates an exemplary process for transferring a gift from one consumer 110 to another. In this exemplary embodiment, the transaction administrator 330 instructs the authentication engine (step 502) to verify the identity of the giving consumer (step 504) who then initiates the gifting process by communicating a gifting request to a gifting merchant (step 506), the request being communicated to the transaction administrator (step 508). In response, the transaction administrator 330 communicates a request (step 510) to the value source 230 to authorize (step 512) and submit (step 514) the charge. Next, the transaction administrator 330 communicates a request (step 516) to the account administrator 340 to store value in the consolidated account (step 518). In response, the account administrator 340 communicates a request to the value source 230 with the request for value (step 520). Then, the gifting merchant sends a gift notification to the receiving consumer (step 522). Finally, the transaction administrator 330 instructs the authentication engine to verify the identity of the receiving consumer who may then receive the gift (step 524).

As discussed above, the present invention provides a stored value instrument that accommodates a variety of sources of value. Accordingly, it may be adapted to redeem incentive value earned from non-financial sources such as membership or loyalty rewards or the like, using a consolidated account 350. To accomplish the redemption of value from non-financial sources requires a method of conversion to be provided. This may be provided directly by the value source or the consumer. If any of the databases or platforms are incompatible, the system will implement the appropriate conversions, such as, for example, the system disclosed in U.S. Provisional Patent application Ser. No. 60/280,806, filed Apr. 2, 2001, and U.S. Pat. No. 7,047,525, entitled "System And Method For An Interoperability Framework", issued on May 16, 2006, which are hereby incorporated by reference.

Figure 6:
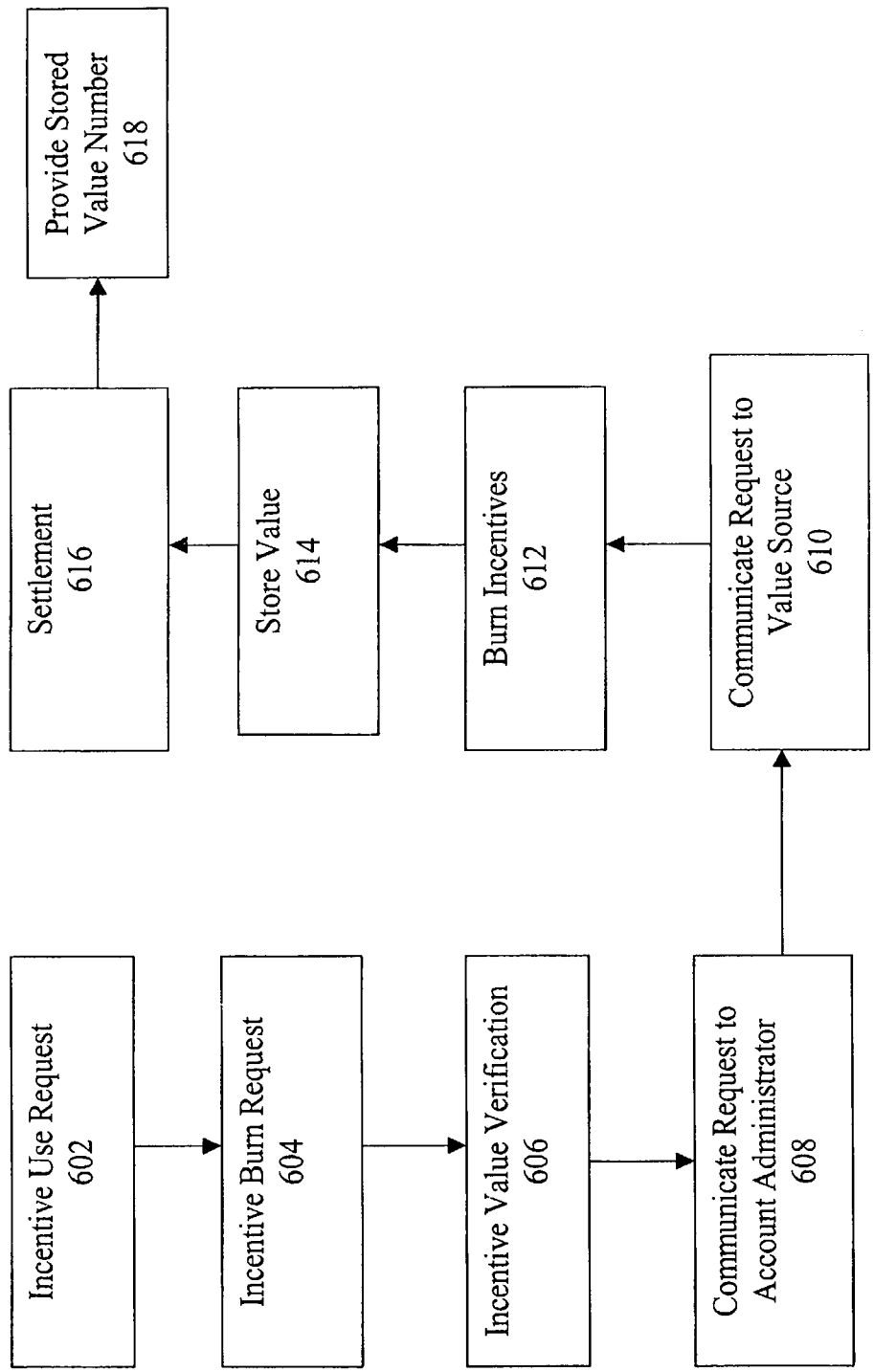
FIG. 6 illustrates an exemplary process for redeeming incentive value using a consolidated account.

In one embodiment, FIG. 6 illustrates an exemplary process for redeeming incentive value using a consolidated account 350. In this exemplary embodiment, a consumer 110 whose identity has been verified by the authentication engine, requests the use of accrued incentives at a web site or a merchant site (step 602). Then, the transaction administrator 330 communicates a request to an incentive engine with an incentive burn request and the value source identifier and the identity of the consumer's consolidated account (step 604). Next, the incentive engine verifies that the appropriate quantity of incentive value has been earned (step 606) and communicates a request to the account administrator (step 608). The account administrator 340 then communicates a request to the value source (step 610) to burn the incentives (step 612) and store the corresponding value in (e.g., fund) the consolidated account (step 614). The account administrator 340 then creates a debit to the card account for the stored value purchase and a credit to offset the purchase with the incentive (step 616). Finally, the transaction administrator 330 provides the consolidated account number to the merchant for the purchase (step 618).

It should be noted that the process of funding the consolidated account is distinct from the process of paying the merchant. As discussed above, the consolidated account shields the merchant from the source of funds for the transaction. Accordingly, the use of loyalty points to fund the consolidated account is completely shielded from the merchant as well. For example, if a consumer wishes to use the consolidated account to burn their points, the corresponding monetary value is placed into the consolidated account, and the consolidated account may then be used like any other card product on the merchant site. There is nothing that identifies the actual source of the value to the merchant.

Figure 7:
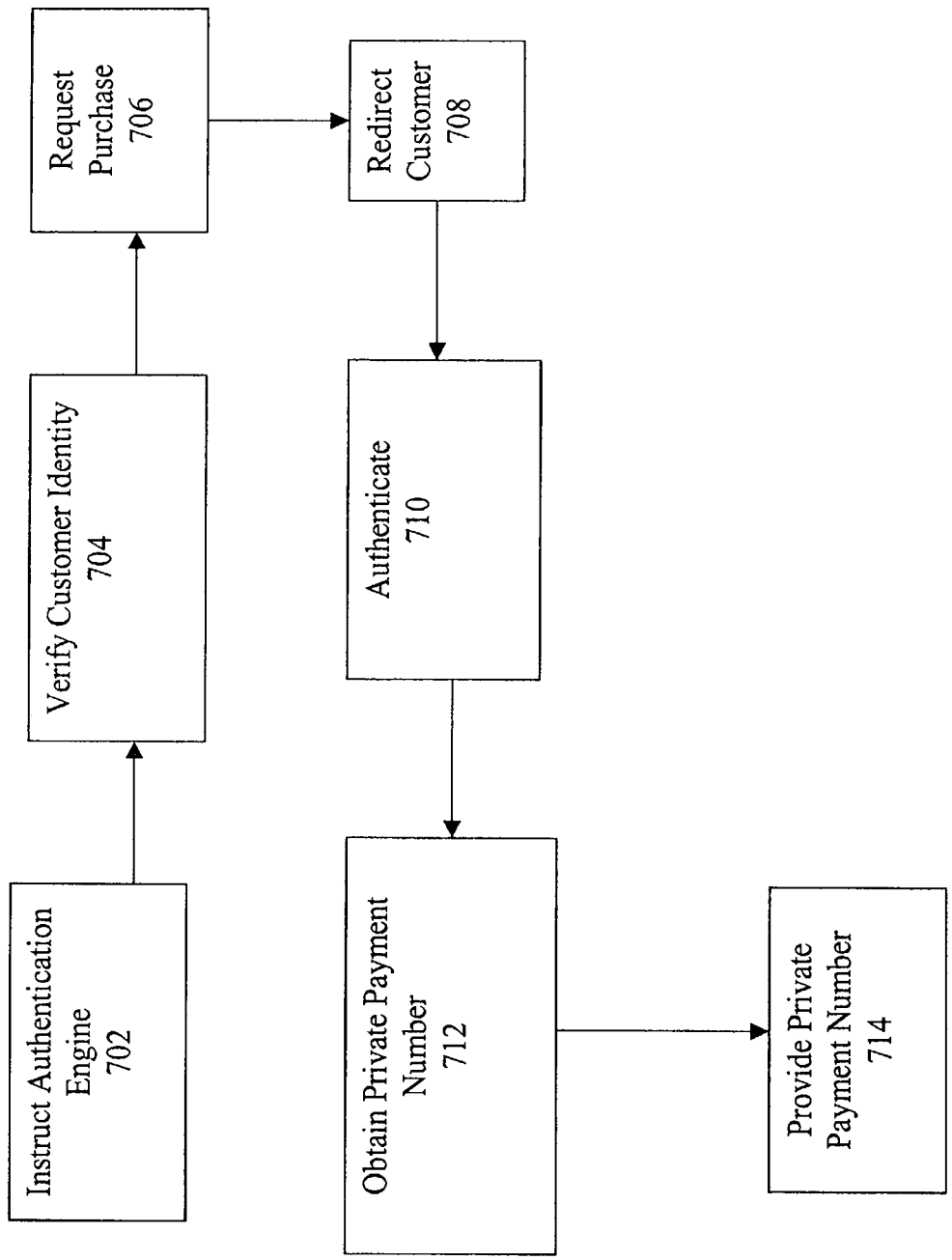
FIG. 7 illustrates an exemplary method for facilitating consumer purchases from a merchant site where a remote card is present.

FIG. 7 illustrates another aspect of the present invention, in which the consolidated account 350 provides a method for facilitating consumer purchases from a merchant site where a remote card is present. In this aspect, the consumer provides additional information that authenticates their identity. In this embodiment, the transaction administrator 330 instructs the authentication engine (step 702) to verify the identity of a consumer (step 704), who then requests to make a purchase at a merchant site (step 706). In response, the transaction administrator 330 redirects the consumer 110 to the account administrator (step 708). The value source 230 then interfaces with the consumer 110 to authenticate the consumer's credit card usage, separately from the transaction administrator 330, using information known by the value source 230 about that consumer (step 710). This includes multiple levels of verification, including value source identifier, CID, billing address, etc. It may also involve a user ID and password or a chip and pin. Next, the transaction administrator 330 obtains a private payment number to blind the value source (step 712). Finally, the transaction administrator 330 provides a private payment number to the merchant to effect payment for the transaction (step 714).

In addition to allowing a consumer to specify how a consolidated account may be funded, a consolidated account may also permit a merchant or other value recipient to specify how they wish to receive the value, e.g., in dollars, beans, loyalty points, or any other form of value. Accordingly, a consolidated account may serve as a two-way proxy that may satisfy the wishes of the parties on both ends of a transaction. As such, a consolidated account may be used to facilitate transactions between parties who may be accustomed to paying and receiving payments in differing forms. Thus, a consolidated account may facilitate transactions across diverse geopolitical regions and may be used, for example, to facilitate transfers of value from a government entity, parent, or company in one part of the world to a serviceman, dependent, or representative in another region of the world, with both parties specifying the form of value with which they wish to conduct the transaction. Moreover, by issuing a consolidated account, an issuer may accommodate multiple merchants, each of which may be configured to accept only a specific type of instrument, e.g., VISA or American Express, while the issuer need only issue the single consolidated account. Thus, a consolidated account may be simultaneously configured to accommodate the specific needs and preferences of multiple merchant as well as multiple consumers.

Other systems that may be integrated with, or layered on, the present invention include, for example, other loyalty systems, transaction systems, electronic commerce systems and digital wallet systems such as, for example, the Shop AMEX™ system as disclosed in Ser. No. 60/230,190 filed Sep. 5, 2000; the MR as Currency™ and Loyalty Rewards Systems disclosed in Ser. No. 09/834,478 filed on Apr. 13, 2001; a Digital Wallet System disclosed in U.S. Pat. No. 7,343,351 issued on Mar. 11, 2008, (aka U.S. Ser. No. 09/652, 899 filed Aug. 31, 2000); a Stored Value Card as disclosed in U.S. Pat. No. 7,216,091 issued on May 8, 2007, (aka U.S. Ser. No. 09/241,188 filed on Feb. 1, 1999); a System for Facilitating Transactions Using Secondary Transaction Numbers disclosed in U.S. Pat. No. 7,627,531 issued on Dec. 1, 2009, (aka U.S. Ser. No. 09/800,461 filed on Mar. 7, 2001); Methods and Apparatus for Conducting Electronic Transactions disclosed in Ser. No. 60/232,040 filed Sep. 12, 2000, all of which are hereby incorporated by reference. Other examples of online reward or incentive systems are disclosed in U.S. Pat. No. 5,774,870, issued on Jun. 30, 1998, and U.S. Pat. No. 6,009,412, issued on Dec. 29, 1999, both of which are hereby incorporated by reference. Additional information relating to smart card and smart card reader payment technology is disclosed in Ser. No. 60/232,040, filed on Sep. 12, 2000, and U.S. Pat. Nos. 5,742,845; 5,898,838 and 5,905,908, owned by Datascape; which are hereby incorporated by reference.

The system of the present invention provides the ability to validate the identity of existing and new consumers as well as the ability to store and authenticate consumer data, and enables consumers to enjoy more manageable billing and payment processes. In addition, the system provides the ability to strengthen consumer loyalty. This consolidated account 350 is a virtual account that enables consumers to pay for web services as well as online purchases using charge, credit and debit accounts across multiple bank relationships (AXP and third party) as well as cash (stored value). In addition, the consolidated account 350 enables additional products and services, such as loyalty benefits, to be layered onto the account. The consolidated account 350 system includes an authentication engine at the disposal of the transaction administrator 330 in addition to a consumer database and a loyalty engine to encourage repeat consumer usage and increase the consumer base. Additional features include private payments, secure payment with or without the card member being present and private billing and shipping. Private payments become available through the present invention, to all bank card consumers. Further, consolidated account numbers can be substituted with private payment numbers to enhance privacy. In this way, consumers benefit from additional security of their number and, simultaneously, merchants are protected from fraud if numbers stored in databases are fraudulently obtained. With respect to the secure payment solution (card member present), payments for consolidated account holders will reduce fraud to merchants through verification of users via ID/password. Alternatively, chip/pin authenticated payments could be offered.

The system may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. As those skilled in the art will appreciate, user computer will typically include an operating system (e.g., Windows NT, 95/98/2000, Linux, Solaris, etc.) as well as various conventional support software and drivers typically associated with computers. User computer can be in a home or business environment with access to a network. In an exemplary embodiment, access is through the Internet through a commercially-available web-browser software package.

Communication between the parties to the transaction and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

Database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access by Microsoft Corporation (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The computer may provide a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access Sequel Server, Oracle, MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography, please review a text written by Bruce Schneier, which is entitled "Applied Cryptography: Protocols, Algorithms, And Source Code In C," published by John Wiley & Sons (second edition, 1996), which is hereby incorporated by reference.

One skilled in the art will appreciate that the network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

The computing units may be connected with each other via a data communication network. The network may be a public network and assumed to be insecure and open to eavesdroppers. In the illustrated implementation, the network may be embodied as the internet. In this context, the computers may or may not be connected to the internet at all times. For instance, the consumer computer may employ a modem to occasionally connect to the internet, whereas the bank computing center might maintain a permanent connection to the internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

The systems may be suitably coupled to network via data links. A variety of conventional communications media and protocols may be used for data links. Such as, for example, a connection to an Internet Service Provider (ISP) over the local loop as is typically used in connection with standard modem communication, cable modem, Dish networks, ISDN, Digital Subscriber Line (DSL), or various wireless communication methods. Merchant system might also reside within a local area network (LAN) which interfaces to network via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The invention claimed is:

1. A method comprising:
    funding, by a computer-based system for providing a payment for a transaction, a consolidated account from a plurality of different funding sources, wherein an acquisition order is determined according to a defined funding profile and a proportion of the value from each of the plurality of different funding sources is determined according to the defined funding profile, and wherein the consolidated account stores a value funded from the plurality of different funding sources;
    dynamically altering, by the computer-based system, the acquisition order in response to a transaction initiation action including a selection of funding sources to pay a payee and based on a real-time current balance of each funding source of the plurality of different funding sources and based on a statement cutoff date of each funding source of the plurality of different funding sources; and
    paying, by the computer-based system, the payee with at least part of the funded value from the consolidated account to any network merchant.

2. The method of claim 1, further comprising providing a statement indicating at least one of a source of funds for payments made from the consolidated account, a source of funds stored in the consolidated account, and a quantity of funds stored in the consolidated account.

3. The method of claim 2, wherein the providing a statement is performed according to at least one of a predetermined schedule, a predefined rule, and in response to an occurrence of a triggering event.

4. The method of claim 1, wherein paying the payee further comprises aggregating a series of requests for payment into a single aggregated payment.

5. The method of claim 1, further comprising:
    setting, by the computer-based system, a predetermined usage restriction in a database, wherein the predetermined usage restriction is associated with at least one of the plurality of different funding sources; and
    performing, by the computer-based system and after the funding, a predetermined enforcement policy on at least part of the funds in the consolidated account, wherein the predetermined enforcement policy is based at least in part on the setting.

6. The method of claim 5, wherein setting the predetermined usage restriction further comprises automatically paying the payee with at least part of the funded value in response to the requested funded value being below a pre-selected threshold.

7. The method of claim 1, wherein at least one of an identity of a holder associated with the funding sources and an address of a holder associated with the funding sources is restricted from the payee of the consolidated account.

8. The method of claim 1, wherein a shipping address associated with a holder of the consolidated account is not the same as a shipping address associated with a holder of the funding source.

9. The method of claim 1, further comprising communicating a request for value to the funding sources in accordance with a predefined rule, wherein the rule is based upon at least one of the current balance of the funding source, interest rate of the funding source, transaction date, availability of funds in the funding source, type of merchant associated with the request for value, type of product associated with the request for value, type of service associated with the request for value, a condition based trigger, a funding limit not to be exceeded, and a product type associated with the request for value.

10. The method of claim 9, the predefined rule defined by at least one of a user, an issuer, the payee, and a non-approved merchant.

11. The method of claim 9, wherein the condition based trigger comprises at least one of an unanticipated need for value and an anticipated overdraft of the consolidated account.

12. The method of claim 1, the funding source comprising at least one of a charge account, debit account, credit account, gift account, stored value account, telephone account, loyalty device, a private cash company and vendor sources usable within a merchant network.

13. The method of claim 1, further comprising at least one of:
    communicating, by the computer-based system, an offer to a consumer to provide the consolidated account,
    receiving, by the computer-based system, from a consumer a request for the consolidated account,
    collecting authentication information, by the computer-based system, from a consumer, and
    verifying, by the computer-based system, an identity of a consumer.

14. The method of claim 1, the payment comprising value having a form defined by at least one of a user, the payee, non-approved merchant.

15. The method of claim 1, wherein the funding of the consolidated account occurs substantially simultaneously from the plurality of different funding sources.

16. The method of claim 1, wherein the consolidated account is further configured to disable itself in response to a transaction request with a non-approved merchant.

17. The method of claim 1, wherein paying the payee further comprises paying at least one of a subscription fee, a recurring charge, a renewable payment, a periodic service, a location based service, a digital rights management service, a micro-payment, and a sweep account.

18. The method of claim 1, further comprising communicating, by the computer-based system, a proxy payment number in place of a consolidated account number to pay the payee, wherein a double blind is created between the payee and the underlying consolidated account when the private payment number is used in conjunction with the consolidated account.

19. A system comprising:
a tangible, non-transitory memory communicating with a processor for providing a payment for a transaction, the tangible, non-transitory memory having instructions stored thereon that, in response to execution by the processor, cause the processor to perform operations comprising:
funding, by the processor, a consolidated account from a plurality of different funding sources, wherein an acquisition order is determined according to a defined funding profile and a proportion of the value from each of the plurality of different funding sources is determined according to the defined funding profile, and storing in the consolidated account a value funded from the plurality of different funding sources;
dynamically altering, by the processor, the acquisition order in response to a transaction initiation action including a selection of funding sources to pay a payee and based on a real-time current balance of each funding source of the plurality of different funding sources and based on a statement cutoff date of each funding source of the plurality of different funding sources; and
paying, by the processor, the payee with at least part of the funded value from the consolidated account to any network merchant.

20. A non-transitory computer-readable storage medium having stored thereon a plurality of instructions for causing a computer to provide a payment for a transaction, the plurality of instructions, when executed by a processor for providing a payment for a transaction, are configured to cause the processor to perform operations comprising:
funding, by the processor, a consolidated account from a plurality of different funding sources, wherein an acquisition order is determined according to a defined funding profile and a proportion of the value from each of the plurality of different funding sources is determined according to the defined funding profile, and wherein the consolidated account stores a value funded from the plurality of different funding sources;
dynamically altering, by the processor, the acquisition order in response to a transaction initiation action including a selection of funding sources to pay a payee and based on a real-time current balance of each funding source of the plurality of different funding sources and based on a statement cutoff date of each funding source of the plurality of different funding sources; and
paying, by the processor, the payee with at least part of the funded value from the consolidated account to any network merchant.

* * * * *

UNITED STATES PATENT AND TRADEMARK OFFICE
CERTIFICATE OF CORRECTION

PATENT NO.        : 8,504,474 B2
APPLICATION NO.   : 12/845412
DATED             : August 6, 2013
INVENTOR(S)       : David Armes et al.

Page 1 of 1

It is certified that error appears in the above-identified patent and that said Letters Patent is hereby corrected as shown below:

On the Title page, item (75) Inventors, please delete "Trey Neeman" and insert therefor
--Trey Neemann--.

Signed and Sealed this
First Day of December, 2015

Michelle K. Lee
*Director of the United States Patent and Trademark Office*